UNITED STATES PATENT OFFICE 2,195,196

METHOD OF DIMINISHING THE SWELLING OF CATION-EXCHANGING RESINS

Hans Wassenegger, Dessau in Anhalt, and Robert Griessbach, Wolfen, Kreis Bitterfeld, Germany, assignors to I. G. Farbenindustrie Aktiengesellschaft, Frankfort-on-the-Main, Germany No Drawing. Application July 7, 1938, Serial No. 218,015. In Germany July 21, 1937

5 Claims. (Cl. 260—49)

The present invention relates to a method of diminishing the swelling of phenol resins in aqueous solutions.

The cation exchange resins produced by a condensation of mono- or polyhydric phenols or phenolsulfonic acids have chiefly the disadvantage that they swell comparatively strongly in aqueous media whereby their capacity per unit volume is diminished. Added to this, the swelling frequently strongly diminishes the stability of the resin especially at high temperatures, for example in the neighbourhood of the boiling point of water, so that the use of the resin, for example for softening hot water, is precluded. The capacity of the resin for swelling may obviously be diminished by lowering the proportion of the active component, but in that case one must be content with a lower efficiency.

This invention relates to a method of making less capable of swelling resins having a high content of active groups capable of cation exchange by treating the resin, after it has been made, with a mineral acid of medium strength or a strong mineral acid, for instance sulfuric acid, phosphoric acid or hydrochloric acid, if desired at a raised temperature. The granular resin is introduced into the acid, which operation in the case of strong sulfuric acid or phosphoric acid involves a considerable rise of temperature, which, however, for example by adjustment of the quantity introduced at each addition, should be so moderated that a temperature of about 100 to 120° C. is not exceeded. In other cases, for example when hydrochloric acid or dilute sulfuric acid is used, it is preferable to preheat the acid or to heat it subsequently to about 100° C. The resin is allowed to remain in the acid, if desired over night. It is then removed from the acid and washed. As compared with the original resin the treated material has a considerably diminished capacity for swelling even in steam; the exchange capacity per unit volume is raised.

With regard to the choice of the acid to be used, it may be said that by dilute acids active groups are liable to be eliminated, which, obviously, means a diminution of the exchange output. When concentrated acid is used, especially sulfuric acid, this undesired reaction is counteracted; by using sulfuric acid of very high concentration (fuming sulfuric acid) there may be secured an additional sulfonation. The treatment is generally advantageously conducted at a temperature up to about 120° C.; at higher temperatures and also when agents of too strong an action, for example fuming sulfuric acid of high percentage strength, are used, too much degradation of the resin occurs, and in some cases a carbonization. The best concentration of hydrochloric acid for the treatment is within the range of 16 per cent. to 32 per cent.; when sulfuric acid is used it may have a content of $SO_3$ between about 60 per cent. and 85 per cent. The use of phosphoric acid has the advantage over that of sulfuric acid that a somewhat higher temperature, for example 150° C. or higher may be used, because the elimination of water, that is to say an after-condensation, acts to prevent decomposition.

By correlation of the temperature of reaction, the time of treatment and the concentration of the acid, the hardening effect in the particular case may be influenced to the desired extent.

The following examples illustrate the invention, the parts being by weight:

Example 1.—A resinous jelly made by condensing a suspension of 380 parts of phenol, 126 parts of sodium sulfite and 20 parts of caustic soda in 400 parts of water with 580 parts of formalin of 40 per cent. strength is dried at 80° C., then comminuted and treated with hydrochloric acid 1:1 for 5 hours. By the action of the hydrochloric acid at ordinary temperature the capacity of the resin for swelling in water is lowered from 90 per cent. to 40 per cent.; by action of the acid at 50 and 100° C., respectively, the drop is to 29 and 11 per cent., respectively.

Example 2.—The resinous jelly made by condensing a suspension of 1350 parts of phenol and 630 parts of sodium sulfite in 1500 parts of water with 2700 parts of formalin of 30 per cent. strength is dried at 80° C. and comminuted to a size of grain of 0.5 to 2 mms. By boiling this material for 5 hours with hydrochloric acid 1:1, the capacity for swelling is reduced to the extent represented in the following table:

|  | Swelling in percent by— | | |
| --- | --- | --- | --- |
|  | Water | Hydrochloric acid 1:1 | N/10 caustic soda lye |
| Untreated resin | 56 | 44 | 92 |
| Treated resin | 24 | 24 | 24 |

Example 3.—A resinous jelly made by condensing a suspension of 72 parts of resorcinol and 75 parts of sodium sulfite in 110 parts of water with 124 parts of formalin of 30 per cent. strength is dried at 80° C. and reduced to a size of grain of 1 to 3 mms. It is then boiled for one hour in hydrochloric acid 1:1, whereby the following diminution of the capacity for swelling is obtained:

|  | Swelling in percent by— | | |
| --- | --- | --- | --- |
|  | Water | Hydrochloric acid 1:1 | N/10 caustic soda lye |
| Untreated resin | 104 | 52 | 88 |
| Treated resin | 44 | 32 | 56 |

Examples of the treated and untreated resin were exposed in an iron pot to a current of steam for 14 days. The untreated resin swelled to a soft jelly and was partially dissolved, while the treated resin remained quite stable in form and yielded no appreciable quantity of soluble constituents.

*Example 4.*—A resinous jelly made by condensation of a suspension of 44 parts of phenol and 25 parts of sodium sulfite in 50 parts of water with 120 parts of formalin of 30 per cent. strength is dried at 80° C. and comminuted to a size of grain of 1 to 3 mms. 1 kilo of this product is cautiously mixed with 1 liter or sulfuric acid of the concentration named in the subjoined table and after standing for several hours the mixture is heated for 6 hours on the steam bath. After separating the sulfuric acid and washing the resin until neutral, the resin exhibited the effective capacity for swelling and the exchange capacity per unit volume set forth in the following table:

|  | Swelling in percent by— | | | Exchange capacity per unit volume |
| --- | --- | --- | --- | --- |
|  | Water | Hydrochloric acid 1:1 | N/10 caustic soda lye |  |
| Resin untreated | 112 | 48 | 124 | 1.43 |
| Resin treated with sulfuric acid of 90 per cent. strength | 76 | 56 | 76 | 1.74 |
| Resin treated with sulfuric acid of 98 per cent. strength | 47 | 35 | 66 | 1.78 |
| Resin treated with fuming sulfuric acid of 20 per cent. strength | 30 | 24 | 28 | 1.42 |

The invention is not limited to the exact details described, for obvious modifications may occur to a person skilled in the art.

What we claim is:

1. A method of diminishing the swelling of insoluble cation-exchanging resinous gels produced by condensing a phenolic body with more than a molar equivalent of an aldehyde which comprises after-treating the resin at a temperature from about 100° C. to about 120° C. with sulfuric acid having a content of about 60 to about 85 per cent $SO_3$, without substantial reduction in the insolubility of the resin.

2. A method of diminishing the swelling of insoluble cation-exchanging resinous gels produced by condensing a phenolic body with an aldehyde which comprises after-treating the resin at a temperature up to about 100° C. with hydrochloric acid of about 16 to about 32 per cent strength.

3. A method of diminishing the swelling of insoluble cation-exchanging resinous gels produced by condensing a phenolic body with an aldehyde which comprises after-treating the resin at a temperature up to about 150° C. with phosphoric acid.

4. Cation-exchanging, insoluble, resinous phenol-aldehyde gels obtainable according to claim 5.

5. A method of diminishing the swelling of insoluble cation exchanging resinous gels produced by condensing a phenolic body with more than a molar equivalent of an aldehyde which comprises after-treating the gel with a large quantity of a hot concentrated inorganic acid selected from the class consisting of hydrochloric, sulphuric and phosphoric acids without substantial reduction in the insolubility of the resin.

HANS WASSENEGGER.
ROBERT GRIESSBACH.